July 9, 1935.  J. KING  2,007,865
SLIDING ROOF FOR VEHICLE BODIES
Filed Nov. 7, 1934  2 Sheets-Sheet 1
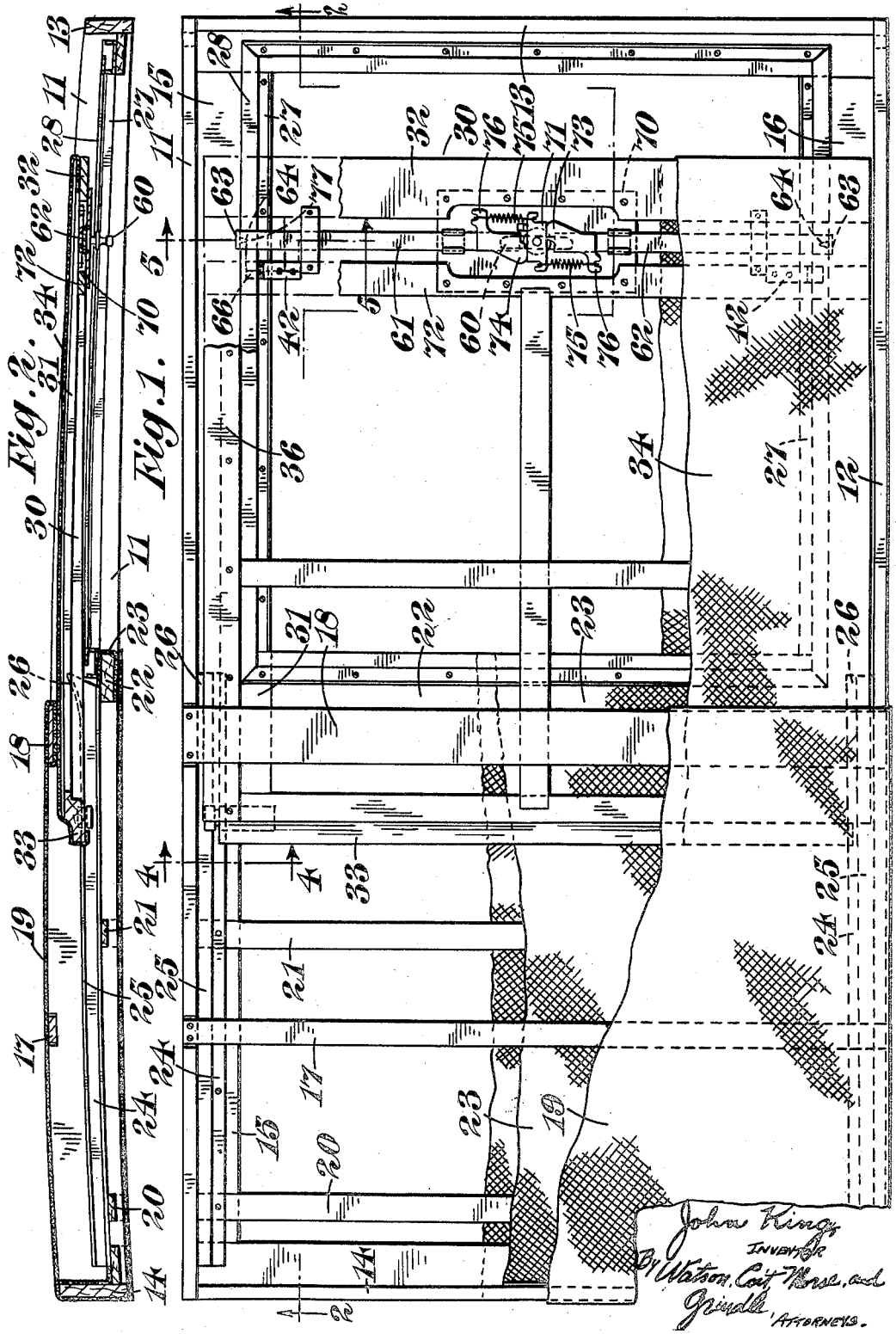

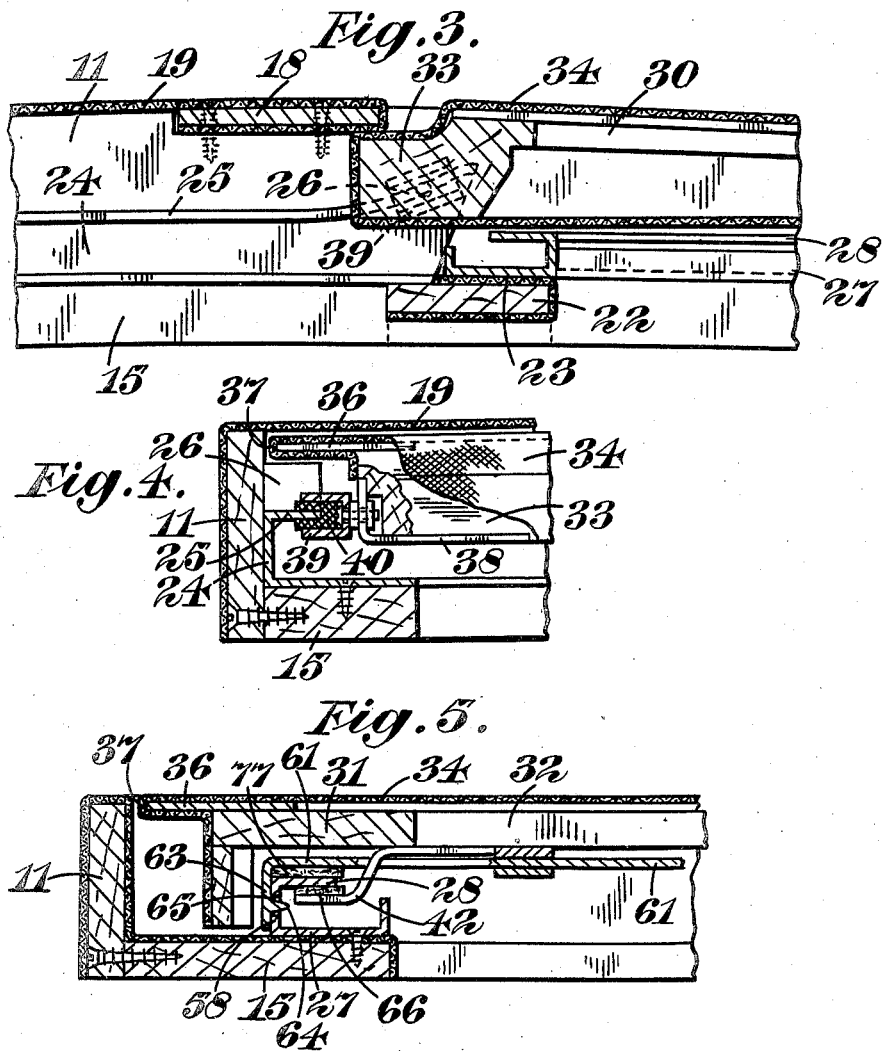

Patented July 9, 1935

2,007,865

UNITED STATES PATENT OFFICE 2,007,865

SLIDING ROOF FOR VEHICLE BODIES

John King, Golders Green, London, England

Application November 7, 1934, Serial No. 751,921
In Great Britain September 28, 1933

5 Claims. (Cl. 296—137)

This invention comprises improvements in or relating to sliding roofs for vehicle bodies. It is an object of the invention to provide a sliding roof for a vehicle body which is capable of being slid back as to part of its area so as to provide an opening in the roof and which will present a flush appearance over substantially the whole of the roof covered area, both when open and when closed.

The present invention relates to sliding roofs of the type wherein the sliding panel of the roof is mounted upon longitudinal runways which lie beneath a fixed portion of the roof so that when the roof is open the sliding panel enters beneath the fixed portion.

According to the present invention a sliding roof of the type described is characterized by the fact that the runways for the sliding panel of the roof are curved upwardly at the point where they engage the rear part of the sliding panel on its emerging from beneath the fixed portion of the roof so that the sliding portion is at the moment when the roof is closed lifted flush with the fixed portion of the roof.

Preferably the sliding panel engages the runways by means of runners which restrain it from both upward and downward movements and are pivotally mounted upon the panel so that they may rotate relatively thereto to follow the upward curvature of the runways.

The runways may comprise inwardly-directed flanges and the runners pivotally mounted upon the roof comprise outwardly-directed felt-lined channel members sliding on the said flanges.

The following is a description by way of example of one form of roof in accordance with the present invention. The roof is shown in the accompanying drawings in which:—

Figure 1 is a plan of the roof showing some of the parts broken away;

Figure 2 is a vertical section on the line 2—2 of Figure 1, looking in the direction of the arrows;

Figure 3 is an enlarged view of a portion of the parts shown in Figure 2.

Figure 4 is a detail section taken along the line 4—4 of Figure 1, looking in the direction of the arrows; and Figure 5 is a section on the line 5—5 of Figure 1.

The roof as shown comprises a wooden frame consisting of longitudinal members 11, 12 and cross-members 13, 14 which are intended to be built into the roof of a motor vehicle. These frame-members are flat pieces of wood set with their longest dimensions upright and the longitudinal frame-members 11, 12 have secured along their lower underside edges horizontally-extending flat members 15, 16, thus making the composite longitudinals into members of angle section. Flat steel cross-members 17, 18 unite the longitudinals 11, 12, being secured to the upper edges thereof, and over these and the rear cross-member 14 there is stretched roofing fabric 19 which covers substantially half the area of the roof, constituting the fixed roof portion under which the sliding panel hereinafter described is adapted to slide.

Moreover, there are other cross-members 20, 21, 22, which extend between the parts 15, 16 of the longitudinal members of the framework at a lower level than the cross-members 17, 18, and over these is stretched fabric 23. Between the two fabric covers 19 and 23 is the space into which the sliding panel enters.

Upon the horizontal battens 15, 16 in the part beneath the fabric 19 there is secured along each side of the roof a brass channel member 24 the lower flange of which is screwed to the longitudinal batten below it and the upper inwardly-directed flange 25 of which constitutes a runway for the sliding panel of the roof. As best seen in Figure 3 this runway extends beneath the fabric 19 and parallel therewith for the greater part of its length, but at the front end beneath the cross-member 18 it is upswept or upturned as shown at 26. At the upturned portion this, which may be termed the rear runway, ends.

Further forward a steel channel section 27 constitutes a forward runway, the bottom flange being screwed to the battens 15 or 16, as the case may be, and the outer side-flange 58 carrying an inwardly-directed upper flange 28. (See Figure 5.)

Upon the two sets of runways there is mounted to slide a sliding panel 30. This is constituted by longitudinal members 31 parallel with the longitudinals 11, 12 and by cross-members 32, 33 which unite the longitudinals into a framework and over which is stretched a fabric covering 34. As best seen in Figures 4 and 5 the longitudinal members 31 of the sliding panel are set sufficiently near together to come within the flanges 25 of the rearmost longitudinal runways and lie between them, and in order to extend the width of the sliding panel so that it overlies the runways and fills up the space as far as the side longitudinals 11, 12, metal pates 36 are screwed to the upper sides of the longitudinal members 31 and the fabric 34 is carried around the edges of these plates as shown at 37 (Figure 4).

Metal brackets 38 (Figure 4) are secured to the underside of the sliding panel at its rear corners and on these are pivoted short lengths of channel section 39 which embrace the flanges 25 of the runways 24, a piece of felt 40 being interposed to prevent looseness and rattling.

At the front portion of the sliding panel 30 there is secured to the underside of the cross-member a metal plate 42 underlying the flange 28 of the adjoining runway 27.

The sliding panel carries a locking device operated by a handle 60 below the front edge of the panel. The handle 60 operates sliding cross-bolts 61, 62, which lie transversely across the upper flange 28 of the runways 27 and are bent down outside them at 63 (Figure 5). The end 63 of each bolt carries a conical locking-peg 64 capable of entering any one of a series of holes 65 in the outer flange 58 of the runway 27. The undersides of the bolts 61, 62 carry felt pads 77 to rest on the flanges 28 of the runways 27 and the front end of the roof is prevented from lifting or moving out of its proper plane by being held against downward movement by pad 77 and against upward movement by the plate 42 which carries a fibre pad 66. This prevents rattling and at the same time the panel may be readily removed for repair or recovering upon merely unscrewing the plates 42.

The handle 60 is mounted to turn in a plate 70 secured to the underside of the cross-member 32 at the front edge of the roof and to the underside of a second cross-member 72. The stem of the handle 60 carries above the plate 70 a cam 71 of rectangular form which lies between two unsymmetrical projections 73, 74 carried on the inner ends of the bolts 61, 62. These projections engage with the cam 71 on opposite sides of its axis so that rotation of the cam in a clockwise direction as viewed from above in Figure 1, will move the bolts 61, 62 outwardly. Springs 75 link the ends of the cam with hooks 76 on the bolts and tend to draw the parts back into the inmost position in which the projections 64 enter the locking holes 65 in the runways 27. To unlock the roof a slight clockwise rotation of the handle suffices and it can then be slid in a fore and aft direction into any desired position of adjustment in which it will be locked when the handle is released and the conical ends 64 of the bolts enter a pair of locking holes in the runners.

Although a particular locking device has been herein described for use in conjunction with the roof shown, it is to be understood that this locking device forms no part of the present invention but is the subject matter of a separate co-pending application in Great Britain No. 30,737 dated 26th October, 1934 in the names of Weir and King. Any other device for locking the sliding panel upon its runways could be provided according to the present invention along the front edge of the panel.

When the sliding panel 30 is run rearwardly it enters beneath the fixed panel 19. When it is drawn forwardly it emerges from beneath the panel 19 and at the conclusion of this forward or closing movement the pivoted runners 39 on the rearward runways 24 engage the upswept portion 26 of the runways and lift the panel 30 so that the surface of its upper covering 34 comes flush with the surface of the covering 19, as shown in Figure 3.

Although the edge of the sliding panel which last emerges from beneath the fixed panel 19 has, for convenience in the description, been herein referred to as the rear edge of the panel, and the other edge as the front edge of the panel, with corresponding nomenclature of the other parts, it is to be understood that this does not necessarily imply that these are the rear and front edges respectively in relation to the movement of a vehicle upon which the parts are mounted, as the roof might be mounted with the sliding panel opening either towards the front or towards the rear of the vehicle, or it might be adopted upon some roof which did not form part of a vehicle at all.

I claim:

1. In a vehicle the combination of a tray-like depressed frame forming a part of the roof structure, the upper edges of the tray sides being flush with the outer surface of the roof, said frame having an aperture occupying part of its area, a cover above the part of the frame arranged flush with the surrounding roof surface, stationary runways upon the frame beneath said cover which have an upwardly extending ramp of limited extent at their ends nearest said aperture, other runways upon the frame alongside said aperture, a sliding panel mounted at one edge to run along the first said runways and at the other edge to run along the second said runways and means mounted adjacent to that edge of the sliding panel which in operation overlies said aperture to lock said panel to said second runways.

2. A roof for vehicles or the like comprising, in combination, a fixed roof structure provided with a covered portion and an open portion, a slidable panel adapted to be moved from a position covering the opening to a retracted position beneath the covered portion, runners provided on said panel adjacent the edges thereof, straight runways carried by the fixed roof structure on either side of the opening for guiding the runners adjacent one edge of the panel, and separate stationary runways provided beneath said covered portion of the roof structure for guiding the runners at the opposite edge of the panel, the ends of said last named runways adjacent the margin of the opening being curved upwardly so as to bring the panel to a position wherein it is substantially flush with the covered portion of the fixed roof portion.

3. A roof for vehicles or the like comprising, in combination, a fixed roof structure provided with a covered portion and an open portion, a slidable panel adapted to be moved from a position covering the opening to a retracted position beneath the covered portion, runners provided on said panel adjacent the edges thereof, straight runways carried by the fixed roof structure on either side of the opening for guiding the runners adjacent one edge of the panel, and separate runways provided beneath said covered portion of the roof structure for guiding the runners at the opposite edge of the panel, the ends of said last named runways adjacent the margin of the opening being curved upwardly so as to bring the panel to a position wherein it is substantially flush with the covered portion of the fixed roof portion, and a downwardly and outwardly offset edge on the panel which abuts the underside of the covered portion at the margin of the opening when said panel is in closed position.

4. A roof for vehicles or the like comprising, in combination, a fixed roof structure provided with a covered portion and an open portion, a slidable panel adapted to be moved from a position covering the opening to a retracted position beneath the covered portion, forward and rear flanged runways provided on either side of the roof structure for guiding the panel, the forward runways being disposed one on either side of the opening, and the rear runways disposed beneath the covered portion of the roof structure and terminating at the forward end adjacent the margin of the opening in abruptly upwardly curved portions, runners carried by said panel for sliding engagement with said last named runways and comprising short channel members swivelled on the respective edges of said panel and each receiving between its flanges a projecting flange of one of said runways.

5. A roof for vehicles or the like comprising, in combination, a fixed roof structure provided with a covered portion and an open portion, longitudinal flanged runways which lie beneath said covered portion of the roof, said runways being provided with upwardly curved portions adjacent the open portion of the roof structure, a sliding panel arranged to slide beneath the said fixed portion when open and to cover said open portion when closed, and grooved felt-lined runners pivoted upon said sliding panel and engaged with said runways so as to embrace in their grooves the flanges on the runways and thereby to support the panel and restrain it from both upward and downward movements except as permitted by the runways, the pivotal connection of said runners with the panel being such as to permit them to swivel relatively to the panel to follow said upward bends of the runways when the sliding panel is closed and lifted flush with the fixed roof portion.

JOHN KING.